(12) United States Patent
Humele et al.

(10) Patent No.: US 8,231,823 B2
(45) Date of Patent: Jul. 31, 2012

(54) HEATING DEVICE FOR PLASTIC BLANKS

(75) Inventors: Heinz Humele, Thalmassing (DE); Christian Detrois, Golbey (FR); Jochen Forsthoevel, Regensburg (DE); Martin Schloegl, Neusinsing (DE); Johann Zimmerer, Bernhardswald (DE)

(73) Assignee: Krones AG, Neutraubling (DE)

( * ) Notice: Subject to any disclaimer, the term of this patent is extended or adjusted under 35 U.S.C. 154(b) by 77 days.

(21) Appl. No.: 12/300,589

(22) PCT Filed: May 10, 2007

(86) PCT No.: PCT/EP2007/004154
§ 371 (c)(1),
(2), (4) Date: Nov. 18, 2009

(87) PCT Pub. No.: WO2007/131701
PCT Pub. Date: Nov. 22, 2007

(65) Prior Publication Data
US 2010/0052224 A1    Mar. 4, 2010

(30) Foreign Application Priority Data

May 11, 2006  (DE) .................. 10 2006 022 207

(51) Int. Cl.
*B29B 13/08*  (2006.01)
(52) U.S. Cl. .................. 264/489; 264/491; 264/519
(58) Field of Classification Search .................. 264/489, 264/490, 491, 519, 521
See application file for complete search history.

(56) References Cited

U.S. PATENT DOCUMENTS

| 3,830,893 A | 8/1974 | Steingiser |
| 6,979,420 B2 * | 12/2005 | Weber ........................... 264/521 |
| 2003/0001311 A1 * | 1/2003 | Collette et al. ................ 264/255 |
| 2003/0171889 A1 * | 9/2003 | Shelby et al. ................. 702/130 |

FOREIGN PATENT DOCUMENTS

| DE | 2320643 | | 4/1973 |
| JP | 11235751 A | * | 8/1999 |
| WO | 03/055665 A1 | | 7/2003 |
| WO | 2004/067262 A1 | | 8/2004 |
| WO | 2006/105769 A1 | | 10/2006 |
| WO | 2007131701 A2 | | 11/2007 |

OTHER PUBLICATIONS

English machine translation of JP 11235751, retrieved from JPO database Jul. 11, 2011.*
Australian Examiner's First Report on Patent Application No. 2007251881, mailed Jun. 18, 2010.
International Search Report for PCT Application No. PCT/EP07/004154, dated Nov. 23, 2007.

* cited by examiner

*Primary Examiner* — Joseph Del Sole
*Assistant Examiner* — Timothy Kennedy
(74) *Attorney, Agent, or Firm* — Rissman, Hendricks & Oliverio, LLP

(57) ABSTRACT

The invention relates to a method and a device for heating preforms of a thermoplastic material, the preforms, after having been heated, being subjected to a reshaping operation, and microwaves being applied to the preforms, at least during a portion of the period of heating, in a resonator.

19 Claims, 10 Drawing Sheets

HEATING DEVICE FOR PLASTIC BLANKS

CROSS-REFERENCE TO RELATED APPLICATION

This application is filed under 35 U.S.C. 371 as a U.S. national phase application of PCT/EP2007/004154, having an international filing date of May 10, 2007, which claims the benefit of DE 10 2006 022 207.5 having a filing date of Mar. 11, 2006, the contents of which are hereby incorporated by reference in their entirety.

TECHNICAL FIELD

The disclosure relates generally to methods and devices for heating preforms and an arrangement for producing containers that include these methods and devices. More particularly, the disclosure relates to methods and devices for heating preforms via microwaves and an arrangement for producing containers including the same.

BACKGROUND

Frequently, in the production of plastic hollow bodies, a method is used in which preforms are first heated, and then shaped. A particular domain of application of this technique is, for example, the production of foodstuffs containers, in particular plastic bottles, which are produced from preforms. For this purpose, these preforms are heated, and subsequently subjected to final shaping, to form containers. The heating operation is usually performed using infrared radiation or near-infrared radiation. A disadvantage of these heating devices with infrared is that the efficiency of the heating operations is only very low, at approximately 20%.

It is therefore the object of the invention to create a method, a device and an arrangement by means of which it is possible to heat plastic preforms in an energy-saving manner.

SUMMARY OF THE INVENTION

According to one aspect, the disclosure is directed to a method for heating preforms of a thermoplastic material that comprise a region to be heated and a region not to be heated, wherein the preforms are to be subjected to a reshaping operation after heating. The method may comprise moving at least one preform that is to be heated into a resonator, and applying microwaves, at least during a portion of a period of heating, to the region of the at least one preform that is to be heated in the resonator.

The method serves to heat preforms, preforms to be understood to be bodies that are composed mainly of plastic and are reshaped, in particular blow-moulded or stretch-blow moulded, after heating. Preferably, preforms in this case are plastic preforms from which containers for the foodstuffs industry, in particular bottles for the beverages industry, are produced. The plastic is usually a thermoplastic plastic, preferably PET. However, it is also possible to use other materials, such as, for example, PET derivatives/copolyesters, other polyesters, polyamides, polyacryls, polycarbonates, polyvinyls (such as PVC; EVOH; PVA) or polyolefins. In the selection of plastics in this case, a good excitation capability must be the primary objective. A measure of such good excitation capability is a high dielectric loss factor. This means it is possible to heat even plastics that, although they do not have a high dielectric loss factor themselves, nevertheless acquire the latter through addition of additives or through purposeful modifications made to the plastic.

These plastic preforms consist of an opening region, a body region and a base region, the opening region preferably having a screw thread or a plurality of beads, at least one bead preferably being realized as a support ring. In most cases, it is not desirable for the upper part of the preform, i.e. the opening region, to be heated as well, since this region is not intended ultimately to be reshaped. Preforms to be shaped are therefore frequently divided into different regions, which are either not to be heated at all, or are to be heated only slightly. Alternatively, a region that is to be heated slightly, or that is not to be heated, can also be a region that is very thin, and which therefore does not require a large amount of shaping.

It is self-evident that the regions of the preforms that are to be heated can be heated completely in one step, as hitherto, by means of the new heating method, a preferred development of the invention consisting in that the regions of the preforms that are to be heated are heated in a stepwise manner or portionally. Stepwise in this case means that the region of the preforms that is to be heated is heated step-by-step in temporal succession.

The preform in this case is divided into a plurality of sub-regions—preferably 3 to 9—which are heated successively.

Portional heating is understood to be that whereby, although the region to be heated is heated simultaneously, it is nevertheless heated differentially in respect of a height or thickness profile. In addition, portional heating can also be understood to be differential heating in respect of the circumference of the preforms. Circumferentially differential heating makes it possible for differing shapes of containers, such as, for example, oval containers or containers of other contours, to be produced more easily.

According to a preferred development of the invention, the heating of the preforms is performed in a resonator. A resonator is to be understood to be a component into which electromagnetic radiation is introduced and in which the latter, the radiation, is held for a defined period of time by continuous reflection. It is sought to generate in the resonator an appropriate microwave field having an appropriate field-strength distribution. The field-strength distribution in this case depends on the resonator geometry and the other components (e.g. microwave compact head). Appropriate means that it is as uniform as possible for isotropic heating, while a non-uniform field-strength distribution is sought for anisotropic heating. In order to achieve an optimum field-strength distribution, it is also possible to overlay a plurality of microwaves, the microwaves being able to have both the same and differing frequencies.

The resonator is so designed that the resonator height, and thereby also the extent of the microwave field, preferably corresponds to only a portion of the height of the preforms to be heated. Preferably, the height is 0.01 cm to 20 cm, particularly preferably 0.5 cm to 1 cm. Furthermore, the resonator is an open, annular or disc-shaped system, in which the preforms can be inserted. For this purpose, it has a preferably round opening, the diameter of which corresponds approximately to 1.1 to 2 times the diameter of the preform and thus encompasses the full circumference of the preform, at least portionally in respect of its height. In this way, the preform can be moved into and out of the resonator. The resonator width is between 1 cm and 15 cm, preferably approximately 4 cm.

The opening of the resonator in this case is so selected that the diameter is smaller than the wavelength of the radiation that is to heat the preform, in order to prevent the radiation from emerging from the resonator. Such a geometric configuration of the resonator makes it possible to construct a microwave-based heating device for preforms that does not have to fulfil very strict requirements in respect of shielding. Depending on the geometry of the resonator, protective devices that prevent the escape of leakage radiation can be mounted above and/or below the resonator. Preferred protective devices are hollow cylinders whose geometry is matched to the resonator geometry, the wavelength, etc.

The opening of the resonator is preferably so mounted that the preform is moved in the direction of its longitudinal axis into or through the resonator. It is also possible, however, for the resonator to have an opening that makes it possible for the preform to be moved into the resonator, transversely in relation to the longitudinal axis of the preform.

According to a preferred development of the invention, a resonator is assigned to each preform in the heating equipment. An embodiment of the invention consists in that the preforms are transported along a path such as that currently found frequently in the prior art, namely, along two straight lines respectively connected to one another at their ends by reversing regions.

A particularly preferred development of the invention consists, however, in that the resonators revolve in a circular motion about a fixed machine axis. The preforms thus describe a circular path in respect of a plane perpendicular to the machine axis. This variant has the advantage that very high machine speeds can be realized. Preferably, this heating equipment has 10 to 80 resonators, particularly preferably 20 to 40 resonators.

The heating of the regions to be heated is preferably performed such that the preform is moved, in one direction of its longitudinal axis, and subsequently in the opposite direction, through the resonator. It is also conceivable, however, for the preforms to be passed, not merely once or twice, but several times, through the resonator. A straight-line movement, such as, for example, movement twice, four times or six times through the resonator, is particularly appropriate in this case.

It is also possible, however, for the purpose of heating the preforms, to use a resonator cavity into which the region of the preforms that is to be heated is inserted fully. The process of heating can thus take place without movement of the preforms in respect of their longitudinal axis, namely, in that the preforms are inserted, for example radially, in the cavity. Also conceivable, however, is that the preforms be moved into and/or taken out of the cavity vertically.

Instead of the use of a cavity, it is also possible to use a resonator stack, in which a differing number of resonators are stacked over one another, in order thereby to produce a "cavity" into which a preform can be inserted in its entirety, or almost in its entirety, in respect of its length.

A particularly preferred development of the method consists in that the temperature of the preform is measured at least once before and/or during and/or after heating. The method thereby acquires the advantage that a particularly accurate temperature regulation or temperature profiling of the preform is possible, it being immaterial whether the temperature is measured from inside and/or from outside. The measurement is effected by means of an appropriate sensor, such as, for example, a pyrometer or a glass fibre-optic sensor, the latter having the advantage that it is not affected by microwaves and that the microwaves are not affected by the sensor. The pyrometer, however, has the advantage that it operates very rapidly and in a contactless manner.

The measured temperature values are preferably forwarded to an open-loop and closed-loop control device in order that temperature control of the preforms can be effected as precisely as possible, a particularly preferred development of the invention consisting in that, in the case of multiple passage of the preforms through the resonator, the temperature is measured after the first passage, such that an adaptation of the heating operation can be performed even at the stage of a second through-movement of the preform. In this way, it is possible, on the one hand, to produce a very accurate temperature profile and, on the other hand, for external circumstances, such as, for example, the moisture of the preforms, to be taken into account in a particularly satisfactory manner.

As a control variable for the entire operation, it is possible to use not only the temperature of the preform, but also the reflected power of the microwave.

A particular development of the heating operation, including the temperature measurement, consists in that, in a first step, the preform is moved in the direction of its longitudinal axis through the resonator, in a second step the temperature of the preforms is measured while they are still within the zone of influence of the microwave field, the actual temperature profile of the preforms is compared with a specified temperature profile in a third step, and the microwave power/the field-strength distribution in the resonator is immediately adapted in a fourth step, such that an adapted radiation power is already being applied to the preforms during the further movement through the zone of influence of the microwave field. The advantage of this method variant consists in that a very rapid reaction to external circumstances, such as, for example, the moisture content of the preform, is possible. Consequently, the minimum amount of time can be used for the heating operation and, possibly, fewer in and out cycles of passage through the resonator have to be performed.

A further method variant for heating consists in that, in a first step, the preform is moved in the direction of its longitudinal axis through the resonator, in a second step the movement of the preform in the direction of its longitudinal axis is stopped, in a third step determination of a temperature profile of the preform is effected by means of vertically movable temperature sensors, in a fourth step the actual temperature profile of the preform is compared with a specified temperature profile, in a penultimate step the resonator is adapted in respect of its radiation power/field-strength distribution, and in a final step the preform is moved in the opposite direction through the adapted resonator. This method variant has the advantage, inter alia, that, prior to the temperature measurement, the preform retains an equalizing period in which the applied heat can become better distributed. As a result, more precise values are obtained in respect of the wanted temperature profile of the preform.

Clearly, it is also possible to heat preforms, to determine the attained temperature profile at the end of the heating operation, and to determine therefrom the settings for the next heating operations of the preforms. This variant has the advantage of not requiring any powerful or very rapid feedback control algorithms or feedback control structures.

A further possible heating operation consists in that the preforms are put into the resonator when the microwave has been switched off, and are taken out of the resonator when the microwave has been switched on. This enables simple (not strongly profiled) heating operations to be realized rapidly, in an energy-saving manner.

According to a particularly preferred development of the invention, the preforms are rotated about their own longitudinal axis during the heating operation. On the one hand, the rotation can be effected uniformly, which—with a uniform field-strength distribution—results in a uniform temperature profile in respect of the circumference, but it can also be effected in a non-uniform manner, which then results in temperature profiling in respect of the circumference of the preforms. The second method variant can be used, for example, in the production of shaped containers, such as, for example, oval containers. The production of shaped containers can be supported in that an anisotropic field-strength distribution is generated in the resonator or in the cavity, whereby differential heating is effected even if the preforms are not rotated or moved. A further possibility for producing differing temperature regions in preforms is that of differential retention time in the microwave field.

According to the invention, a microwave heating unit has at least one microwave generator, a microwave conductor and a resonator. The microwave generator can be, for example, a magnetron, a klystron or a gyrotron, the waves being able to be generated in any manner. The microwave conductors are preferably hollow conductors, round or rectangular cross-sections being particularly preferable. Use of coaxial conductors is not precluded.

According to a preferred development of the invention, the microwave generator is located in a microwave compact head, the latter further comprising at least a water load, a circulator, a microwave conductor and a heater transformer, as well as terminal leads for the microwave generator and the heater transformer. The water load in the microwave compact had is required for absorbing excess microwave energy and rendering it harmless. This water load is preferably a water-filled silicone or plastic tube, the water circulating in a circuit in order that sufficient residual energy can be absorbed continuously.

Additionally provided is in circulator, which preferably consists of three crossed coaxial conductors, and the function of which is to route microwaves into the compact head, in the correct direction in each case. The circulator is necessary because, inter alia, microwaves that are routed from the site of their generation to the resonator and back again must not flow back into the magnetron, since otherwise there is a risk of the latter being destroyed. In this case, therefore, forwarding into the water load must be performed. For this purpose, the circulator has integrated ferrites, which forward the microwaves to the respectively correct output.

Additionally provided, preferably, is a microwave tuner, which enables the power to be set in the resonator. It is equally possible to use a manual tuner, rather than an automatic tuner, in this case.

According to an embodiment of the invention, a heating oven for preforms has a central microwave generator, which forwards the generated microwaves to the respective generators. This solution has the advantage that the technology to be made available, such as, for example, the microwave generator, is required only once.

Another development of the invention makes provision for a plurality of microwave generators, which respectively supply microwaves to several resonators. It is thus possible, for example, for four microwave generators to be available for the resonators. This solution has the advantage that, in the event of a failure of one microwave generator, at least three-quarters of the heating course can nevertheless continue to be operated. According to a particularly preferred development of the invention, each resonator has its own microwave compact head with a microwave generator. This characteristics enables each preform to receive the most individual treatment possible.

A further advantageous development of the invention consists in that the resonators, with their assigned microwave generators, are located on a carousel that revolves about a central axis. This carousel arrangement has the advantage that very high machine capacities, and thereby preform throughputs, can be realized.

It is also conceivable, however, for the resonators to be fastened to carries that describe, not a circular path, but an at least partially rectilinear path, such as, for example, in linear ovens. For this purpose, it is conceivable for the resonators to be fastened to carriers and for the latter to be moved along a line with the aid of a chain.

The output power of the at least one microwave generator is preferably in the range of between 1 kW and 10 kW, particularly good results being achieved with a generator output power of 2 kW to 3 kW.

The frequency range of the microwaves to be used for heating is between 300 MHz and 300 GHz, particularly preferred frequency ranges being 915 MHz, 2.45 GHz and 5.8 GHz.

According to an advantageous development of the invention, each resonator has a receiving unit for preforms. This receiving unit can preferably be rotated, such that the preform moves about its own axis. A movement along the longitudinal axis of the preform is also necessary, however, in order to move it into and out from the resonator. Preferably, a movement unit has a combined lifting/lowering/rotary drive. Although the movements of the preforms to and in the resonator are preferably effected in the direction of or about the longitudinal axis of the preforms, a movement about other axes is nevertheless also possible. It is thus conceivable, for example, for the preform not to be rotated about its longitudinal axis, but for the preform to execute an oscillating movement about an axis through the resonator. This development has the advantage that the microwaves effect a more random heat distribution in the preform.

Alternatively, however, the resonator can also be moved relative to the preform.

A particularly preferred embodiment consists in that a microwave heating unit is assigned to each preform. Also conceivable are other arrangements, in which there are fewer heating units than preforms that can be accommodated in the device.

In order to increase the capacity of such a heating device, it is also conceivable for a plurality of heating levels to be located above one another. These heating levels can either be loaded independently of one another or also conceivable is a pass in which the preforms are brought into the device on one level while being taken out of the device on the other level.

A further advantageous heating variant consists in that the preforms do not undergo any movement in respect of their longitudinal axis, but the resonators are moved along the preforms.

The heating can be set in an absolutely individual manner for individual or for various groups of preforms. Parameters that can be set independently of one another are, for example, lift, lift speed, rotation speed, microwave power, microwave tuning settings, field-strength distributions in the resonator or impedance matching in dependence on a measured dielectric constant. Individual settings can be necessary for various reasons, such as, for example, because of the differing moisture contents of the preforms.

The device is preferably a heating device for preforms from which PET bottles are produced. It is therefore appropriate for such a heating device to be placed in a machine arrangement comprising, for example, a stretch-blow moulding machine, a filler, a closer, a labelling machine, or the like.

A further advantageous embodiment consists in that the heating device has a slipring joint for high voltage, such that energy can be transmitted from stationary parts into the moving parts.

According to a preferred development of the invention, it is advantageous if not only microwaves, but also infrared radiation, are applied to the preforms. It is thus also conceivable, for example, for a basic heat profile to be imparted to the preform by the infrared radiation and for the exact temperature profiling then to be performed only by the microwave. The inverse of this process is also conceivable, however, i.e., such that a basic temperature profile is imparted only by means of the microwaves, such that a more precise temperature profiling can then be produced in the preform by means of infrared radiation. It is also conceivable in this case, however, for infrared radiators to be additionally mounted in a microwave oven, such that the two heating methods can be combined with one another in any sequence, in any zones and in any intensity.

BRIEF DESCRIPTION OF THE DRAWINGS

An actual embodiment of the invention is described more fully with reference to the following drawings, wherein.

DETAILED DESCRIPTION

Figure 1:
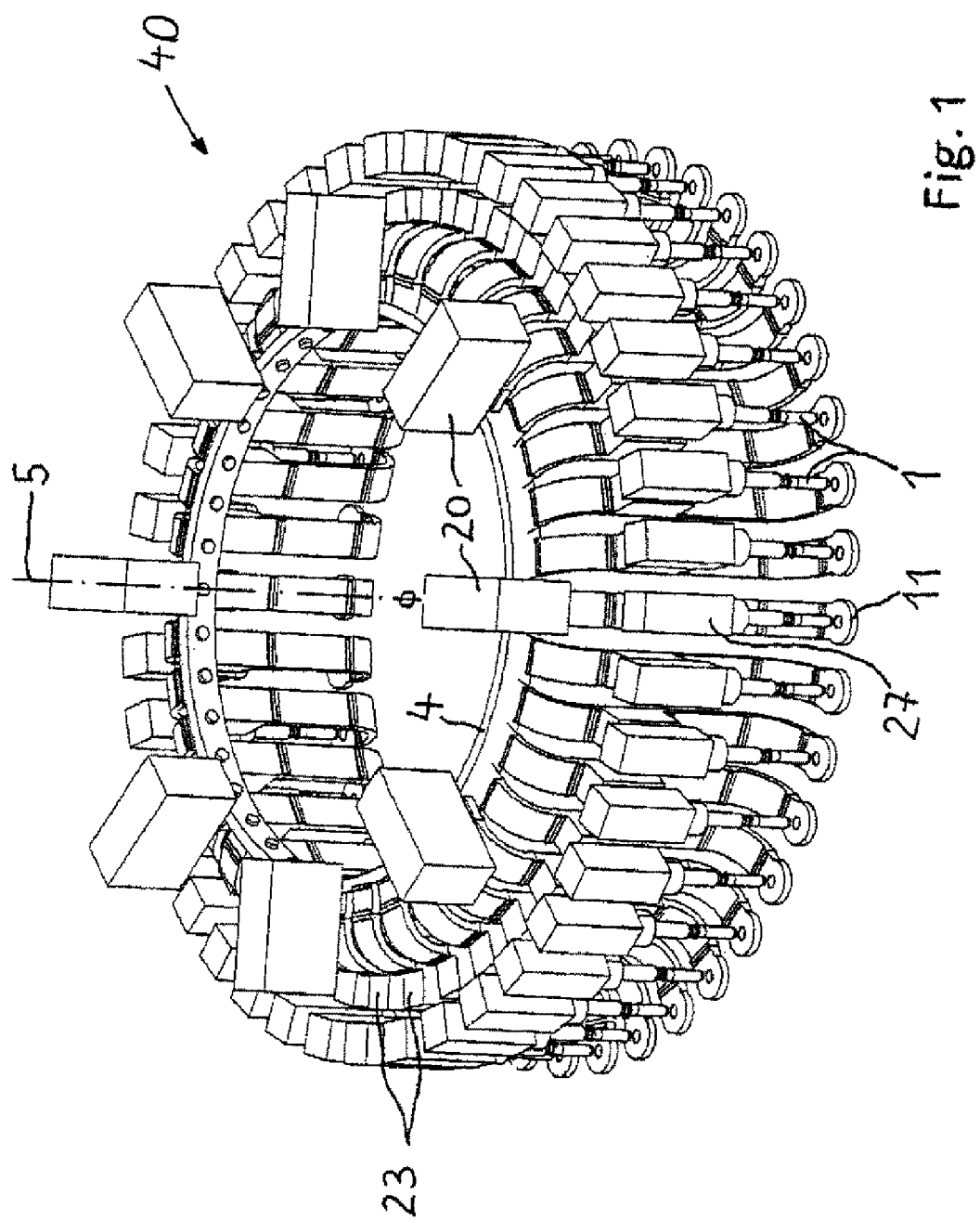
FIG. 1 shows an isometric view of a heating device.

FIG. 1 shows a circular heating device for preforms 1, the latter being moved on a circular path, according to the circumference of the heating device, in the course of the heating operation. The heating device has a carrier 4, which, in this case, simultaneously constitutes a rectangular hollow conductor. Fastened to this carrier 4 are various structural units, for instance eight microwave compact heads 20 and forty microwave heating units 3. These units, fastened to the carrier 4, revolve jointly about the machine axis 5. The transfer from an upstream unit to the oven 40 is effected by means of a star, such as, for example, a sawtooth star or a clip star.

Figure 2:
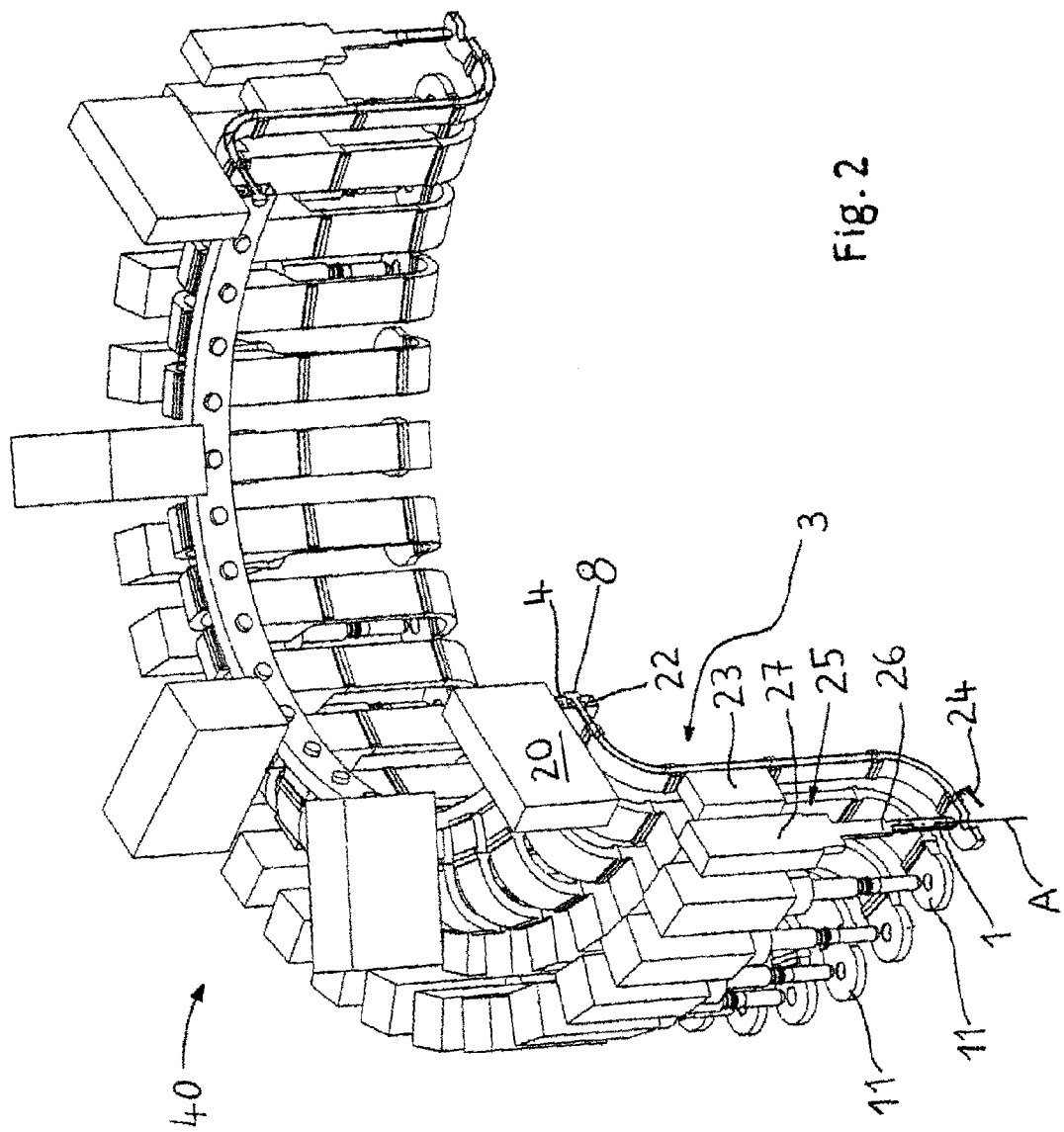
FIG. 2 shows a portion of the heating device according to FIG. 1.

FIG. 2 shows a portion of the oven 40 according to FIG. 1, the microwave heating unit 3 being better explained here. Seen here, likewise, are the microwave compact heads 20, which generate the microwaves and which are directly connected to the carrier 4, which, in this case, constitutes a hollow conductor 22. Mounted in the direction from the carrier 4 towards the microwave heating unit 3 is an injecting element 8, which injects into the microwave heating unit 3, from the carrier 4, the microwaves generated by the microwave compact head 20.

The microwave heating unit 3 consists of a rectangular microwave hollow conductor, bent in an S shape, the first end of which is fastened to the carrier 4 and to the second end of which a resonator 11 is fastened. The resonator 11 is a disc-shaped/plate-shaped, internally hollow element, in the centre of which there is a circular hole. The dimensions of the hole are so selected that the respective preforms 1 to be heated can be guided through without difficulty, the resonator 11 being of a height that corresponds to only a portion of the height of the preforms. The hollow resonator 11 constitutes an extension of the microwave heating unit 3 and—like the hollow conductor—has microwaves flowing through it. Fastened to the microwave heating unit 3, in the region of the resonator 11, is a temperature sensor 24, which measures the temperature of preforms 1 that are being lowered into or raised out of the resonator 11 or are guided out of the latter.

Additionally fastened to the microwave heating unit 3 is a microwave tuner 23, by means of which it is possible to influence the microwaves by altering the conductor space of the microwave heating unit—i.e., to so optimize the field-strength distribution, a preform having been inserted, that the quantity of energy that is reflected, and not absorbed by the preform 1, is minimized—and thereby also to effect open-loop or closed-loop control of the operation of heating the preforms 1.

Located radially outwards before the microwave heating unit 3 there is a receiving unit 25, the basic function of which is to receive the preform 1 and to impart to it a movement that renders possible effective heating. The receiving unit 25 consists of a preform holding unit 26 and a movement unit 27. Here, the preform holding unit 26 is a rod, which goes into the opening of the preform 1 and thereby holds the latter. Preferably, at least a portion of the preform holding unit is to be made of a suitable, non-metallic material, since otherwise leakage radiation might possibly emerge from the cavity. Preferred materials are plastics having a low dielectric loss factor, such as, for example, Teflon.

Here, however, it is conceivable for holding to be effected not only by an internal gripper, but also by an external gripper.

The movement unit 27 is preferably a multifunction drive, with either differing drives being combined to constitute the movement unit 27 or the movement unit 27 being constituted by a drive that fulfils all movement requirements. On the one hand, a lowering movement is required, which inserts the preform 1 in the resonator 11 from above, along the longitudinal axis A of the preform. Also required, on the other hand, is a lifting movement, which takes the preform 1 back out of the resonator 11, along the longitudinal axis of the preform. A further movement, which renders the heating process very much more flexible, is a rotary movement, which allows the preform 1 to rotate about its longitudinal axis A.

Figure 3:
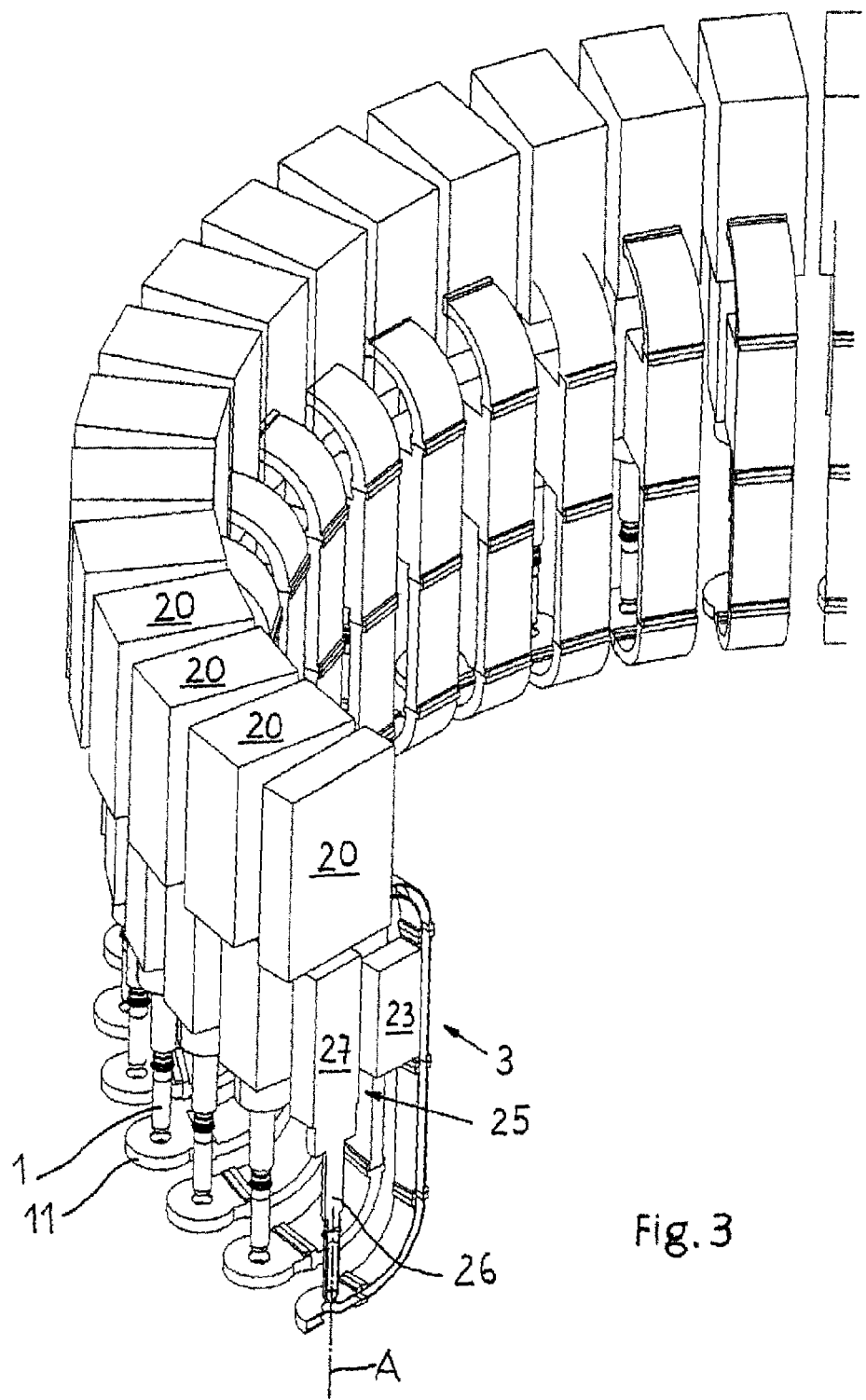
FIG. 3 shows a detail view of a heating device.

FIG. 3 has another embodiment of the heating unit for preforms 1. The essential differences consist in that each microwave heating unit 3 has its own assigned microwave compact head 20. For this purpose, the microwave heating unit 3, which, here likewise, is again realized as a rectangular microwave hollow conductor, is bent radially outwards in a C shape. In this case, the one end opens in the microwave compact head 20, while a resonator 11 is again fastened at the other end. Furthermore, the microwave heating unit 3 again has a microwave tuner 23, which performs the same function as that according to FIG. 2. Here, likewise, the preform 1 is held by a receiving unit 25, which comprises a preform holding unit 26 and a movement unit 27.

Figure 4:
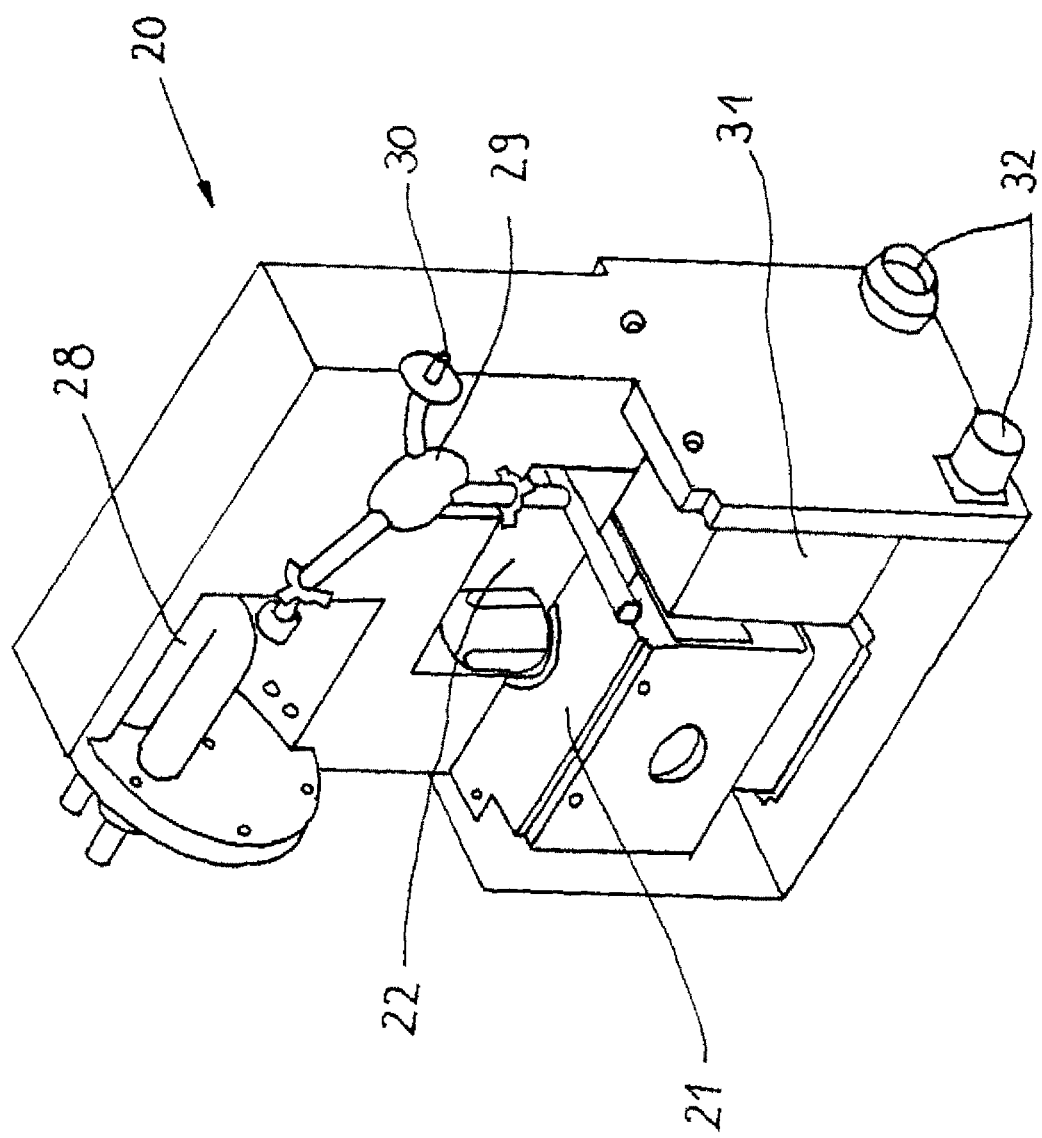
FIG. 4 shows a microwave compact head.

FIG. 4 shows a section through the microwave compact head 20. Located therein is a microwave generator 21, such as, for example, a magnetron or a klystron, by which microwaves are generated and routed, by means of a microwave conductor 22, to the circulator 29 and to the applicator output 30 of the latter. The microwave compact head 20 has two terminations 32, one termination being the plug-in termination for the heating voltage and the other termination being the termination for the high voltage for the microwave generator 21.

Microwaves that are routed from the applicator output 30 into the microwave heating unit 3, not shown in FIG. 4, are reflected continuously, and thus also return back to the circulator 29 of the microwave compact head 20. In order to prevent the microwaves from penetrating the microwave generator 21, the circulator 29 is capable of selectively forwarding reflected radiation in the direction of the water load 28. Here, the water load 28 is constituted by a U-shaped silicone tube that has cooling water flowing through it. This microwave compact head 20 enables the generation of microwaves for heating the preforms 1 to be effected in a very compact, restricted space.

Figure 5:
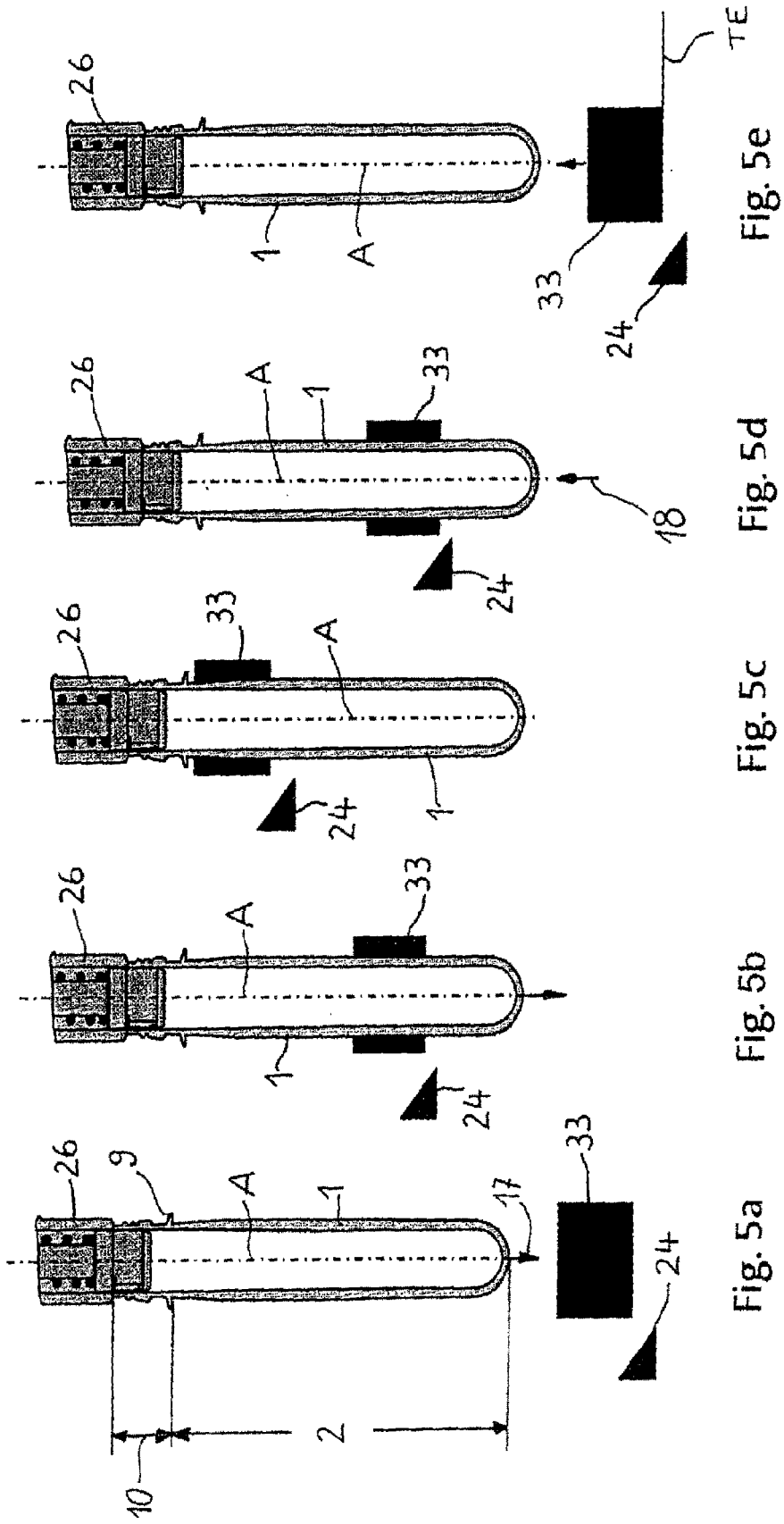
FIGS. 5a to 5e show a schematic operational sequence for the heating of preforms.

FIG. 5 shows, in five steps, various positions of the preform 1 in the course of its heating in the heating unit. The preform 1 in this case has a region 2 that is to be heated, a region 10 that is not to be heated, and a support ring 9 located in the region 10. The preform 1 is placed concentrically on a preform holding unit 26. By means of the movement unit 27 described in FIGS. 2 and 3, it is now possible to move the preform 1 through the resonator 11 in the direction of the arrow 17 and 18. The black bar 33 in this case represents the microwave zone of influence 23 of the resonator 11, not shown here. In a first step, according to FIG. 5a, the preform 1 starts to be moved, along its longitudinal axis A, in the direction of the arrow 17, into the microwave zone of influence 23.

FIG. 5b, already, shows a position in which the preform 1 has been moved to an extent through the microwave zone of influence 33.

The temperature sensor 24, which is mounted a short distance beneath the resonator plane TE, has in this case registered from the outside the temperature of the preform 1, which has already been altered by the microwaves.

Also fundamentally conceivable is a temperature measurement from within the preform 1.

FIG. 5c shows a position in which the entire region of the preform 1 that is to be heated has already been or is in the microwave zone of influence 33. This is also the reversal point, following attainment of which the preform 1 is guided out of the microwave zone of influence 33, along the longitudinal axis A, in the direction of the arrow 18.

FIG. 5d shows a position corresponding to that of FIG. 5b, the preform 1 here being moved along its longitudinal axis A in the direction of the arrow 18. Upon commencement of the removal of the preform 1 from the microwave zone of influence 33, adaptation of the heating by means of microwaves is also performed, such that the specified temperature of the preform 1 can be achieved exactly. Through this combination of temperature sensor 24 and adaptation of the microwaves, a temperature profile that is as exact as possible is to be imparted to the preform 1. The preform holding unit 26 can be provided with a hole, not shown here, through which, for example, a temperature sensor extends into the interior of the preform 1 to be heated, or through which particular media, e.g. a cooling medium for the purpose of temperature equalization, can enter.

FIG. 5e shows a position corresponding to that from FIG. 5a, the heating operation having already been completed here.

There may now follow, for example, a rest phase, although a second or third heating operation, by passage through the microwave zone of influence 33, can also be performed.

Figure 6:
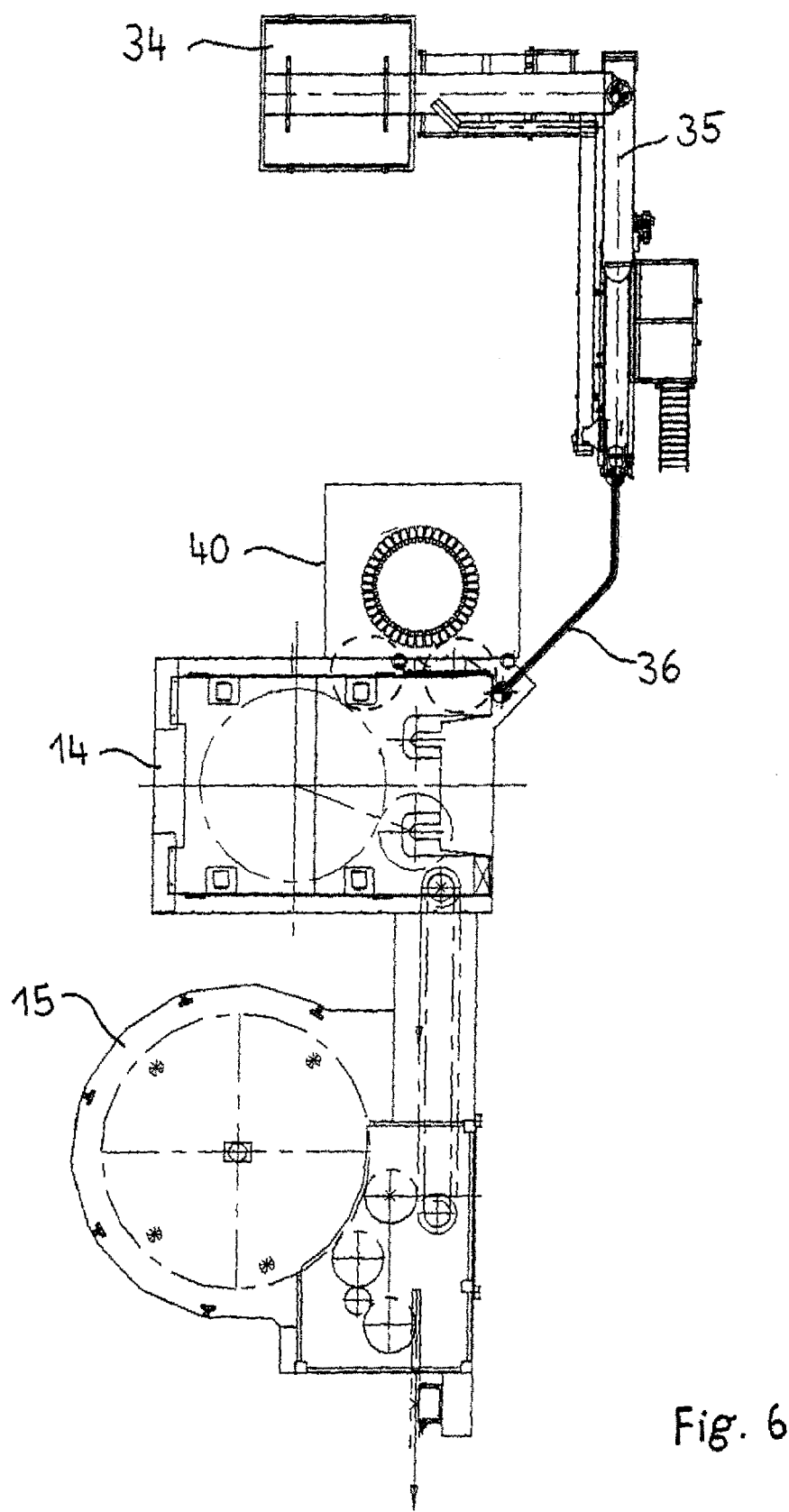
FIG. 6 shows a top view of an installation for producing containers.

FIG. 6 shows a device for producing containers. This device has a preform storage means 34, into which the preforms 1 are put, without having been sorted.

A roller sorter 35 assumes the function of separating and sorting the preforms 1, which are then guided to a feed chute 36 that feeds them to the oven 40.

In the oven 40, the preforms 1 are heated as described. After heating, they are transferred into the stretch-blow moulding machine 14, which produces finished containers. Following production of the containers, they are transferred to the filling machine 15 and into a closing and/or labelling machine, which are not shown further here. In this way, a fully filled and closed container, such as, for example, a beverage bottle, is produced. Mounted between the oven 40 and the stretch-blow moulding machine 14 there are preferably at least two transport stars, which effect active and/or passive cooling of the heated preforms 1. At this point in the production process, it can be necessary for the heated preforms to be provided with an equalization period, in order for the imparted energy to become uniformly distributed. This equalization period can be provided, for example, via integrated transport stars. An equalization or cooling period can also be necessary again after the stretch-blow moulding operation. Here, once again, it is possible to provide active and/or passive cooling of the containers. Active cooling can be effected, for example, by means of water, air, nitrogen or other media, from the inside or from the outside. Passive cooling can be effected through the provision of a transport course between the stretch-blow moulding machine 14 and the downstream machine.

Figure 7:
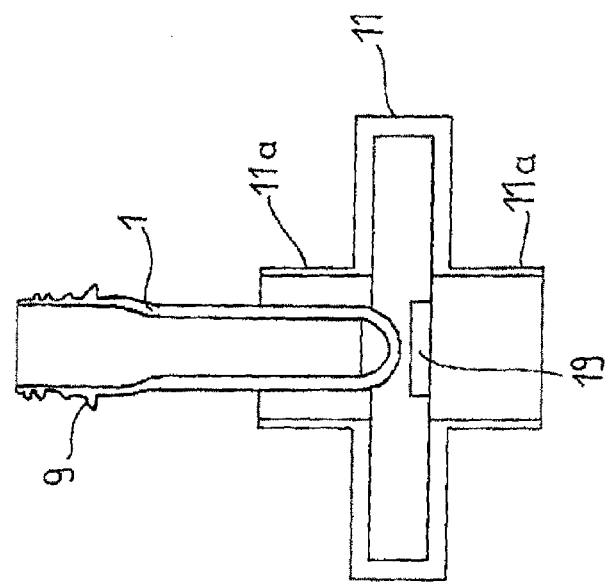
FIG. 7 shows a side view of a resonator.

FIG. 7 shows a resonator 11, which has a hollow cylinder 11a on its upper side and lower side, respectively. This hollow cylinder acts mainly to shield against microwaves. Here, this protective device is cylindrical in form, but it is within the scope of action of persons skilled in the art that this protective device also be of a different design, thus, for example, having an angular cross-section. In the resonator 11 there is a reflector element 19, within the zone of action of the microwave. The function of this reflector element 19 is to additionally heat the tip of the preform 1. The reflector element 19 is so realized that the microwave radiation is focussed in the direction of the tip of the preform 1.

Advantageously, the reflector element 19 is so realized that, during the movement of the preform 1 through the resonator 11, at least in the zone of action of the microwave, it is always at the same distance from the tip of the preform 1. This can be realized, for example, in that the reflector element 19 is moved concomitantly through the resonator 11 in the direction of the longitudinal axis A of the preform 1. It is also conceivable, however, for a plurality of reflector elements 19 to be mounted within the zone of action of the microwave, these reflector elements also being conceivable at various heights. It is then possible for the reflector elements 19 to be swivelled, respectively, into the path of movement of the preforms 1. The reflector element 19 is realized to be easily exchangeable. This has the advantage that various preform geometries can be optimally processed in the resonator 11 in each case.

Figure 8:
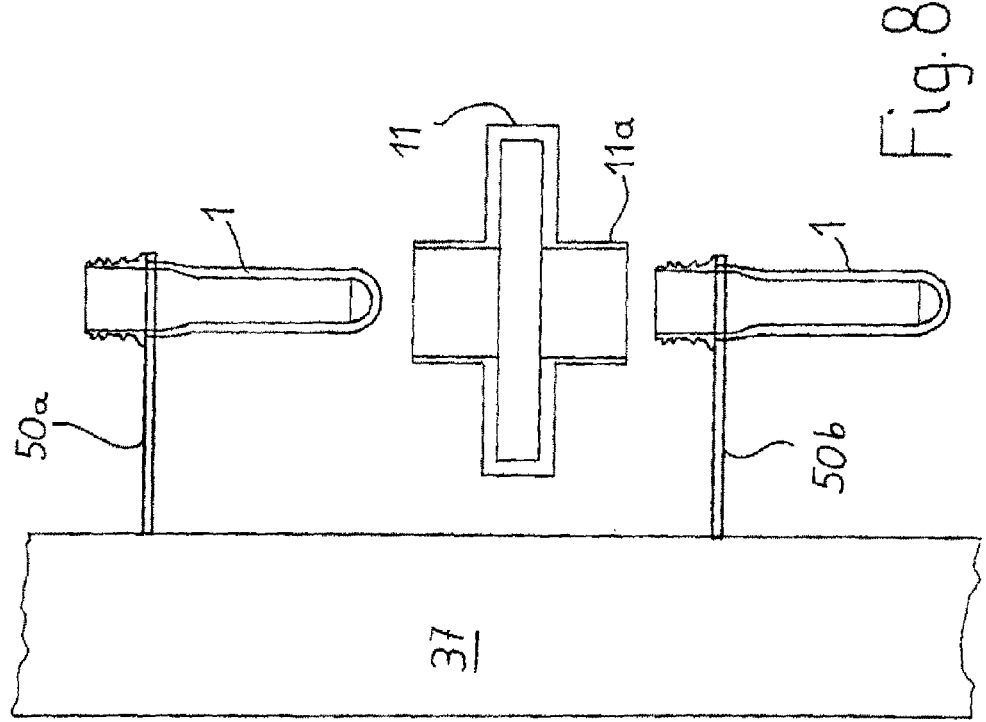
FIG. 8 shows a side view of a transfer situation, from a resonator and to a resonator.

FIG. 8 shows a preferred transfer situation, of preforms 1 to the device, and, at the same time, a takeover situation, of preforms 1 from the resonator 11, before they are transported further to the next machine. The transport of the preforms 1 to the resonator 11 and away from the resonator 11 is performed here by grippers 50a, 50b. The grippers are preferably part of a transfer and takeover star, which are indicated only in schematic form here by the grippers 50a and 50b and by the central column 37. The gripper 50a in this case takes over a preform 1 from an upstream machine, such as, for example, a preform separating device, and then transfers this preform to a preform holding element 26, which then performs the treatment operation described above, with the preform 1 being guided at least once through the resonator 11, along the longitudinal axis A of the preform. When, after its treatment, the preform emerges on the lower side of the resonator 11, it can be gripped, as by the gripper 50a, by a gripper 50b that is operatively connected to the same central column 37, and transferred to a machine located downstream, such as, for example, a labelling machine or a filling machine. In the case of rotary machines, this arrangement has the advantage that a very large angle of rotation can be used as process time. With such an arrangement, process angles of between 300° and 355° can be achieved. In addition, this is a very space-saving solution, since only one transport star is required as an intake and discharge star, whereas two transport stars are integrated in conventional solutions.

Figure 9:
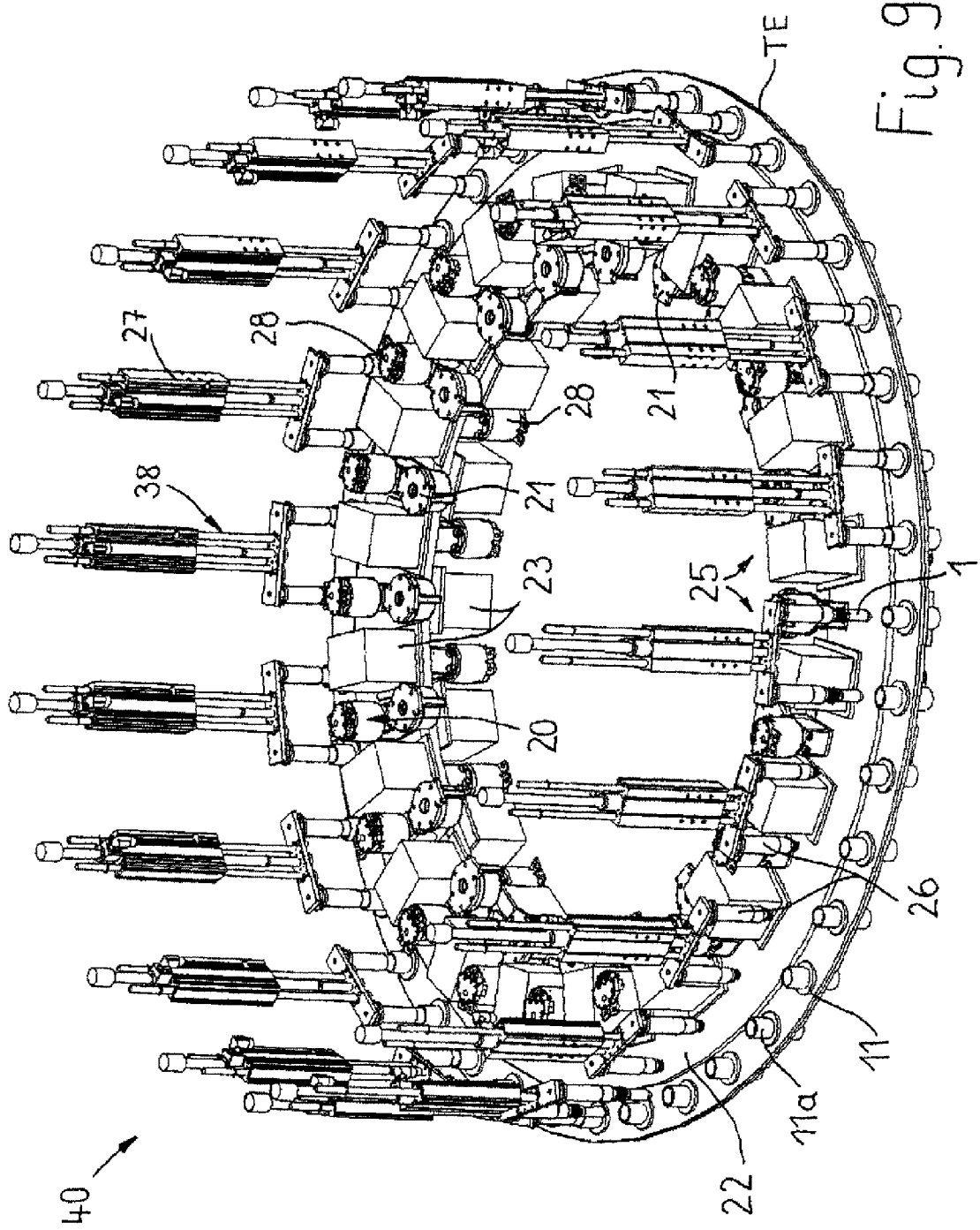
FIG. 9 shows an isometric view of a realization of a heating device.

FIG. 9 shows an isometric view of another embodiment of a microwave heating device, which is realized in a rotary design. The device has a plurality of receiving units 25, a plurality of receiving units 25 (at least two) being mounted on a receiving carrier 38 in each case. The receiving carriers each have a movement unit 27, which is responsible for the lifting movement of the preforms 1 in the direction of the resonators 11. In addition, the preform holding elements 26 have a drive for inducing a rotary movement in the preforms 1. The microwave heating device comprises a plurality of microwave compact heads 20, each consisting of a microwave tuner 23, a water load 28 and a microwave generator 21. For reasons of space, in each case one microwave compact head 20 of a receiving unit 25 is located on the upper side of a disc-shaped microwave conductor 22, and one microwave compact head 20 is located on the lower side. The microwave conductor 22 is realized as a carrier 4 and has a flat disc shape, which is hollow on the inside, to enable it to route the microwaves from the microwave generator 21 in the direction of the resonator 11. The microwave conductor 22 in this case can be so realized that two discs are mounted upon one another, which discs then form an inner cavity and thereby become the hollow conductor, although the conductor can also be so constructed that only segments are mounted upon one another in each case, such that no continuous, circular disc hollow conductor is produced, but such that each resonator 11 forms its delimited hollow conductor 22.

Figure 10:
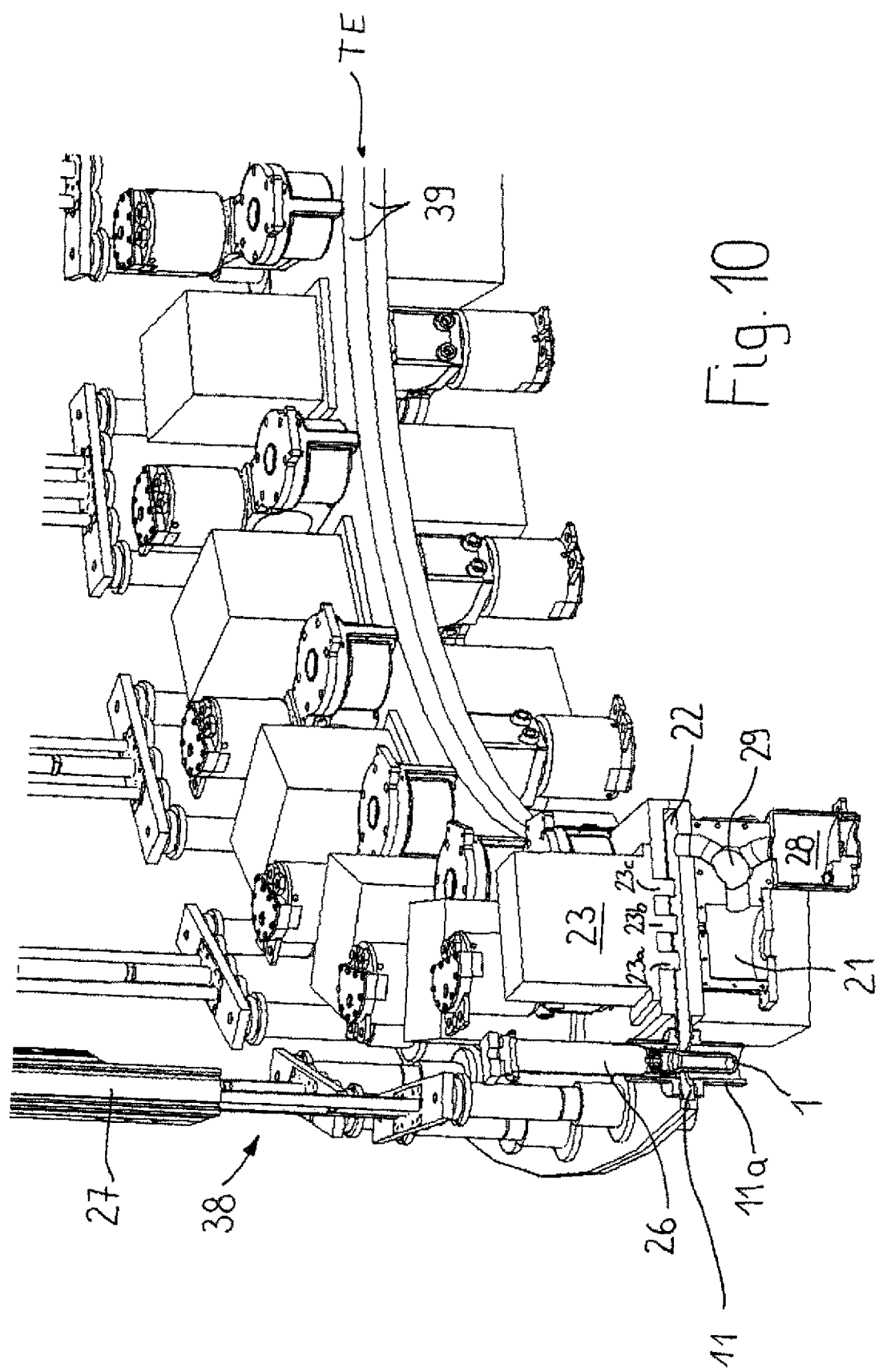
FIG. 10 shows a portion from the representation according to FIG. 9.

FIG. 10 shows a section through the microwave conductor 22 according to FIG. 9. It can be seen that two hollow conductor segments 39 are mounted upon one another in the resonator plane TE, and thereby form a microwave conductor 22. The two hollow conductor segments 39 each have an annular structure. Further outwards on the hollow conductor segments 39 in the circumferential direction are the resonators 11 with the hollow cylinders 11a arranged above and below same, respectively. The individual components can be seen clearly in the section through the microwave hollow conductor 22. Located on the lower side of the hollow conductor segments 39 is the microwave generator 21, as well as the circulator 29 and the water load 28. By means of the circulator, the microwaves are routed from the generator 21 into the microwave conductor 22, and there past the tuner 23, in the direction of the resonator 11. The tuner is so realized that three tuning pins 23a, 23b and 23c extend into the microwave conductor 22, thereby affecting the conduction cross-section. In this way, the heating of the preforms 1 in the resonator 1 can be adapted. This representation shows a preform 1 currently in the resonator 11.

Figure 11:
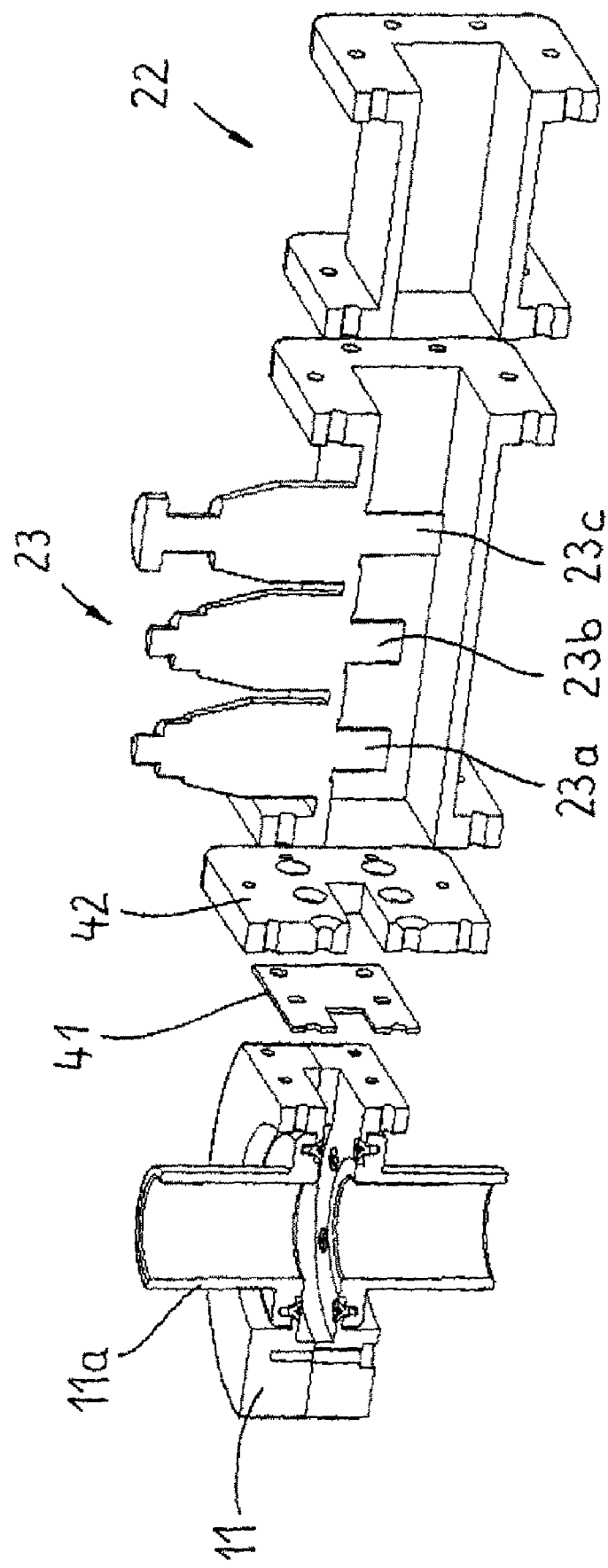
FIG. 11 shows a further embodiment of a microwave conductor with resonator.

FIG. 11 shows a further embodiment of a microwave conductor 22. Unlike the embodiment according to FIG. 10, here the microwave conductor 22 is not constructed from two annular or disc-shaped hollow conductor segments 39, but a hollow conductor profile, from which a plurality of longitudinal pieces are joined together to form an entire hollow conductor. Here, likewise, the microwave tuner 23 can be seen to have three pins 23a, 23b and 23c. Additionally provided, in the direction from the microwave generator 21, not visible here, to the resonator 11, for the purpose of setting an optimum microwave distribution in the resonator 11, is an orifice plate 41, which results in a diameter discontinuity of the microwave conductor 22. A fastening element 42, to which the orifice plate 41 is fastened, is provided for mounting purposes. The fastening element 42 in this case has passage dimensions similar to those of the orifice plate 41.

What is claimed is:

1. Method for heating at least one preform of a thermoplastic material that comprises a region to be heated and a region not to be heated, the at least one preform to be subjected to a reshaping operation after heating, the method comprising:
   moving at least one preform that is to be heated into a resonator; and
   applying microwaves, at least during a portion of a period of heating, to the region of the at least one preform that is to be heated in the resonator,
   wherein the preform is moved one of:
      into the resonator in a direction of a longitudinal axis of the preform, and
      through the resonator in said direction of the longitudinal axis.

2. Method according to claim 1, further comprising simultaneously heating the entire region of the preform that is to be heated.

3. Method according to claim 1, further comprising heating the region of the preform that is to be heated in at least one of a stepwise manner and portionally in succession.

4. Method according to claim 1, wherein the region of the preform that is to be heated is at least one of moved and heated continuously.

5. Method according to claim 1, further comprising moving the preform one of into and through the resonator in one of a direction of its longitudinal axis and a direction perpendicular to its longitudinal axis.

6. Method according to claim 3, wherein the region of the preform that is to be heated comprises at least one portion of the preform,
   the method further comprising moving each portion that is to be heated through the resonator a plurality of times.

7. Method according to claim 3, further comprising:
   guiding the preform, during a movement along a substantially circular path, into the resonator in a direction of its longitudinal axis; and
   guiding the preform back out of the resonator in an opposite direction.

8. Method according to claim 1, wherein each preform is heated in a cavity that fully encompasses the region to be heated.

9. Method according to claim 1, further comprising measuring the temperature of the preform at least once, the temperature being measured on at least one of the outside of the preform and the inside of the preform.

10. Method according claim 9, further comprising:
    comparing a temperature profile of the preform based on the at least one measured temperature with a specified temperature profile; and
    regulating subsequent heating of the preform by adjusting a field-strength distribution in the resonator.

11. Method according to claim 1, further comprising reflecting microwaves toward a closed tip of the preform via a reflector element.

12. Method according to claim 1, wherein the preform rotates, at least partially, about its longitudinal axis in one of a uniform manner and a non-uniform manner.

13. Method according to claim 1, further comprising reshaping the preform by a blow-moulding operation.

14. Method according to claim 1, wherein the preform is heated in a non-uniform manner with respect to at least one of its length, its thickness, and its circumference.

15. Method according to claim 1, further comprising applying infrared radiation to the preform.

16. Method for heating at least one preform of a thermoplastic material that comprises a region to be heated and a region not to be heated, the at least one preform to be subjected to a reshaping operation after heating, the method comprising:
  moving at least one preform that is to be heated into a resonator; and
  applying microwaves, at least during a portion of a period of heating, to the region of the at least one preform that is to be heated in the resonator and heating the region of the preform that is to be heated in at least one of a stepwise manner and portionally in succession.

17. Method for heating at least one preform of a thermoplastic material that comprises a region to be heated and a region not to be heated, the at least one preform to be subjected to a reshaping operation after heating, the method comprising:
  moving at least one preform that is to be heated into a resonator, said moving including
    guiding the preform, during a movement along a substantially circular path, into the resonator in a direction of its longitudinal axis, and
    guiding the preform back out of the resonator in an opposite direction; and
  applying microwaves, at least during a portion of a period of heating, to the region of the at least one preform that is to be heated in the resonator.

18. Method according to claim 1, wherein the preform is moved into the resonator in said direction of the longitudinal axis of the preform, the method further comprising moving the preform back out of the resonator in a second direction opposite to said direction.

19. Method according to claim 1, wherein the preform is moved into the resonator and through the resonator in said direction of the longitudinal axis of the preform.

* * * * *